United States Patent [19]

Kurosawa

[11] Patent Number: 5,111,124
[45] Date of Patent: May 5, 1992

[54] CONTINUOUS DEADBEAT CONTROL SYSTEM WITH FEEDBACK CONTROL

[75] Inventor: Ryoichi Kurosawa, Tokyo, Japan

[73] Assignee: Kabushiki Kaisha Toshiba, Kawasaki, Japan

[21] Appl. No.: 581,901

[22] Filed: Sep. 13, 1990

[30] Foreign Application Priority Data

Sep. 14, 1989 [JP] Japan .................. 1-237153

[51] Int. Cl.$^5$ .............................................. H02P 7/00
[52] U.S. Cl. .................................. 318/434; 318/609; 388/921
[58] Field of Search ............... 318/609, 610, 615–619, 318/561, 625, 628, 632, 685, 431, 432, 434, 254; 388/802, 806, 810, 902, 906, 903, 921; 361/33, 23

[56] References Cited

U.S. PATENT DOCUMENTS

| | | | |
|---|---|---|---|
| 3,863,118 | 1/1975 | Lander et al. ................. | 318/685 |
| 3,864,554 | 2/1975 | Chevalier et al. ............. | 318/561 X |
| 4,069,413 | 1/1978 | Rutledge et al. .............. | 318/609 |
| 4,675,584 | 6/1987 | Karosawa ..................... | 318/434 X |
| 4,675,804 | 6/1987 | Wiemer ....................... | 318/609 X |
| 4,894,599 | 1/1990 | Ottesen et al. ............... | 318/561 X |
| 4,982,145 | 1/1991 | Peterson ...................... | 318/609 X |

OTHER PUBLICATIONS

Finite Time Settling Compensation Using Hysteresis Element: M. Nakano et al., Nov. 6–10, 1989, IECON'89, vol. II, p. 335.

Feedback Control: O. J. M. Smith, McGraw-Hill Book Company, Inc., 1958, P342, P343.

Primary Examiner—William M. Shoop, Jr.
Assistant Examiner—A. Jonathan Wysocki
Attorney, Agent, or Firm—Oblon, Spivak, McClelland, Maier & Neustadt

[57] ABSTRACT

A control computation unit includes a delay element in addition to an integrating element and a proportional element. The delay time of this delay element is selected, following the time necessary for due settling (namely, the time required for rendering a controlled variable to follow changes in a control variable command), or the time necessary to restore the controlled variable to the control variable command when a controlled object involved has incurred a certain external disturbance. In case there exist a computation delay time, a dead time, and/or a detection delay time, respectively in the control computation unit, controlled system, and/or a control variable detector, then the delay time is selected equal to one of the computation delay time, dead time, and the detection delay time, or the sum of these times. Additional provision of the delay element with a delay time equal to the time desired for due settling to the control computation unit results in settling within the time equal to the time desired for due settling the response.

16 Claims, 11 Drawing Sheets

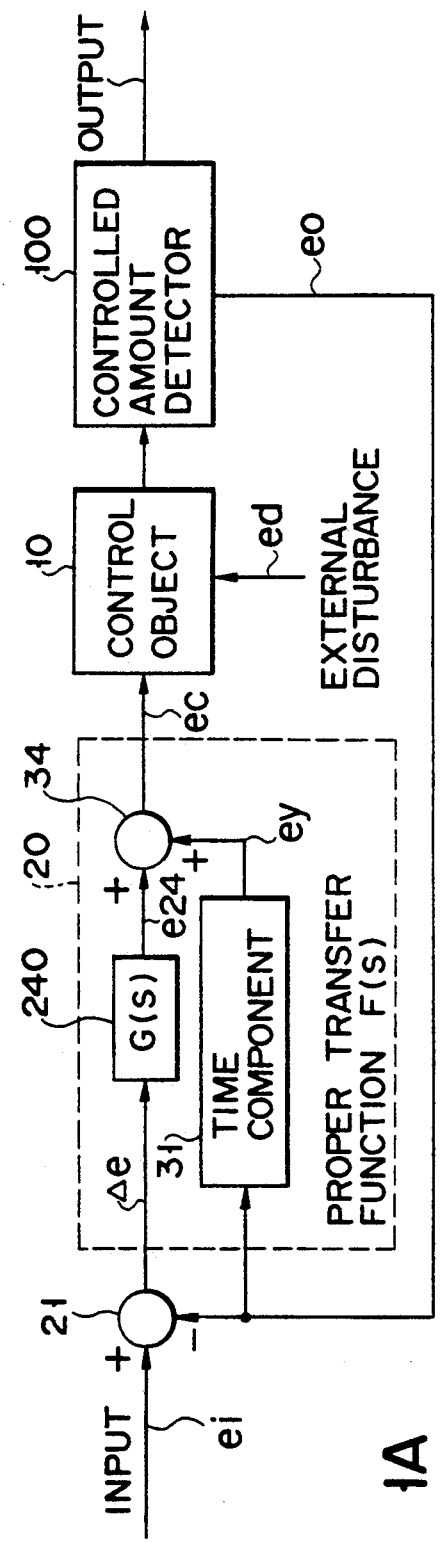
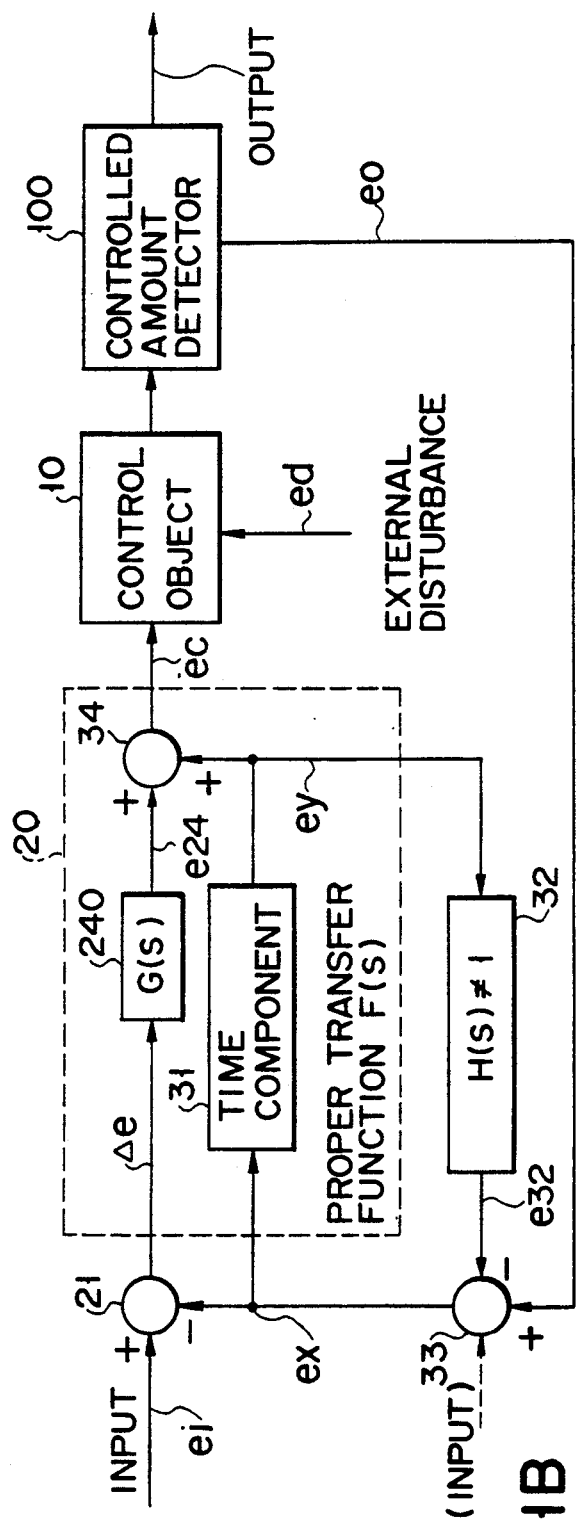
F I G. 1A
F I G. 1B

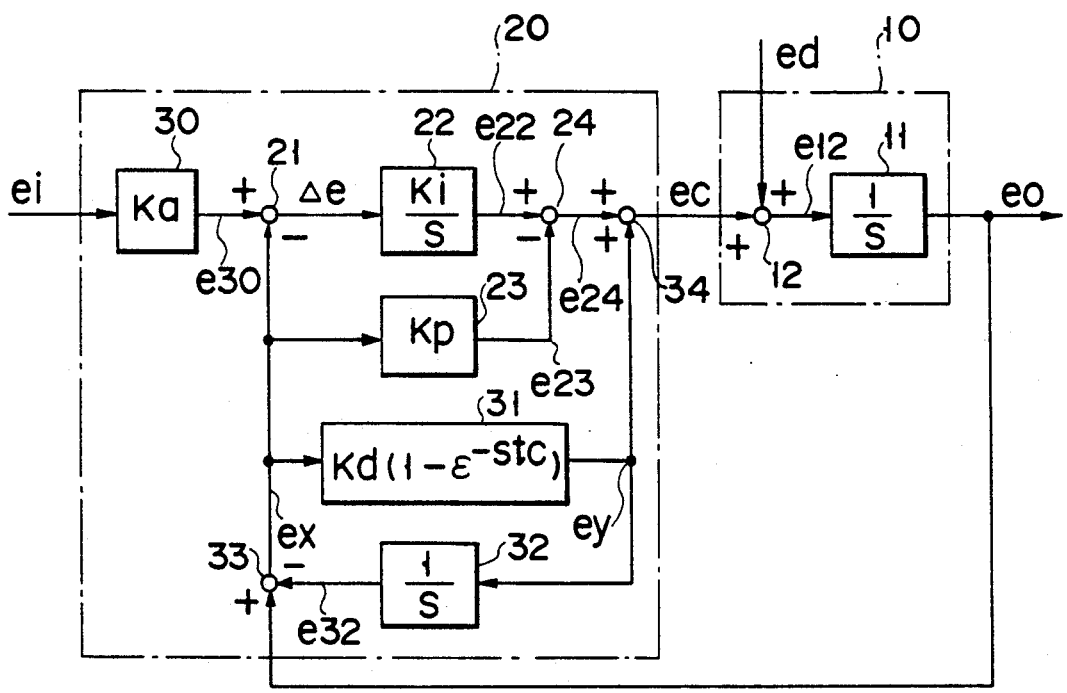
F I G. 2

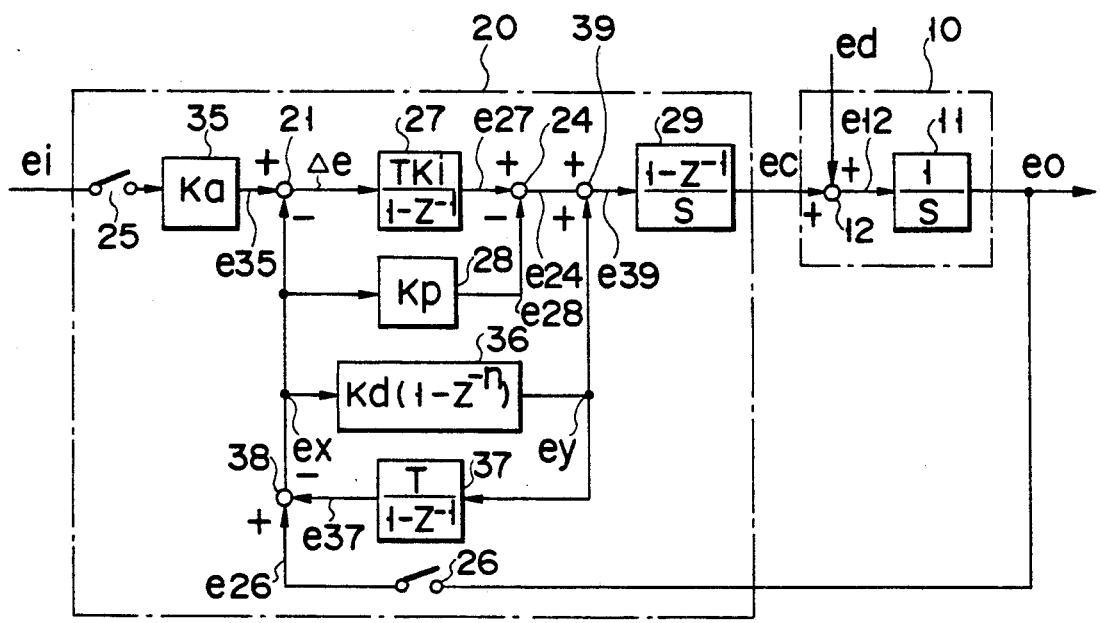
F I G. 5

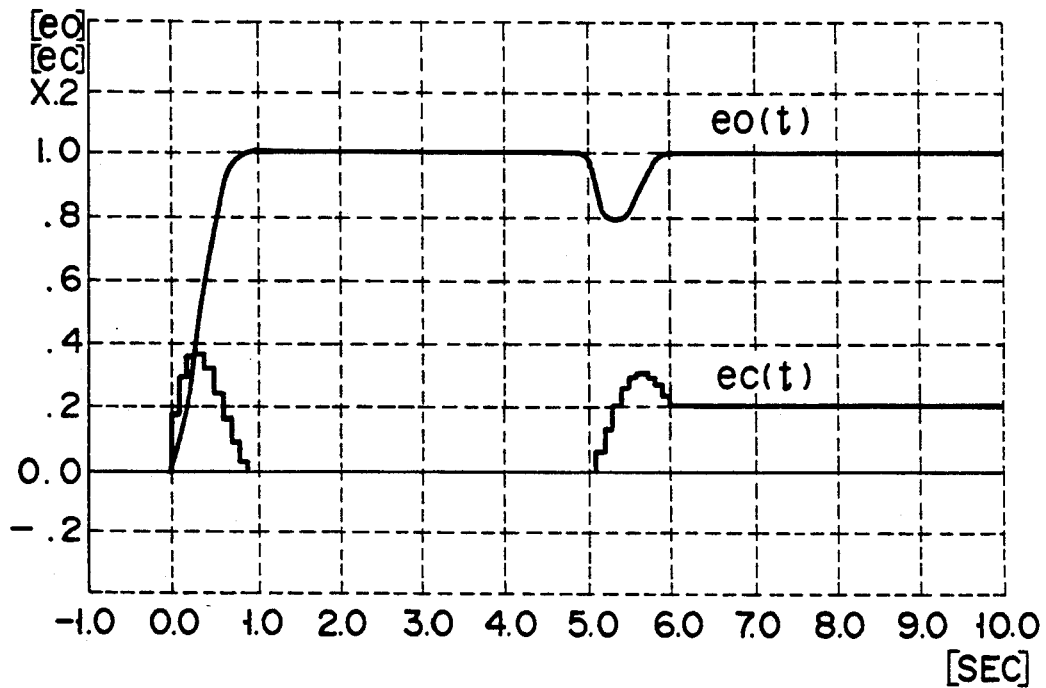
F I G. 6
F I G. 7

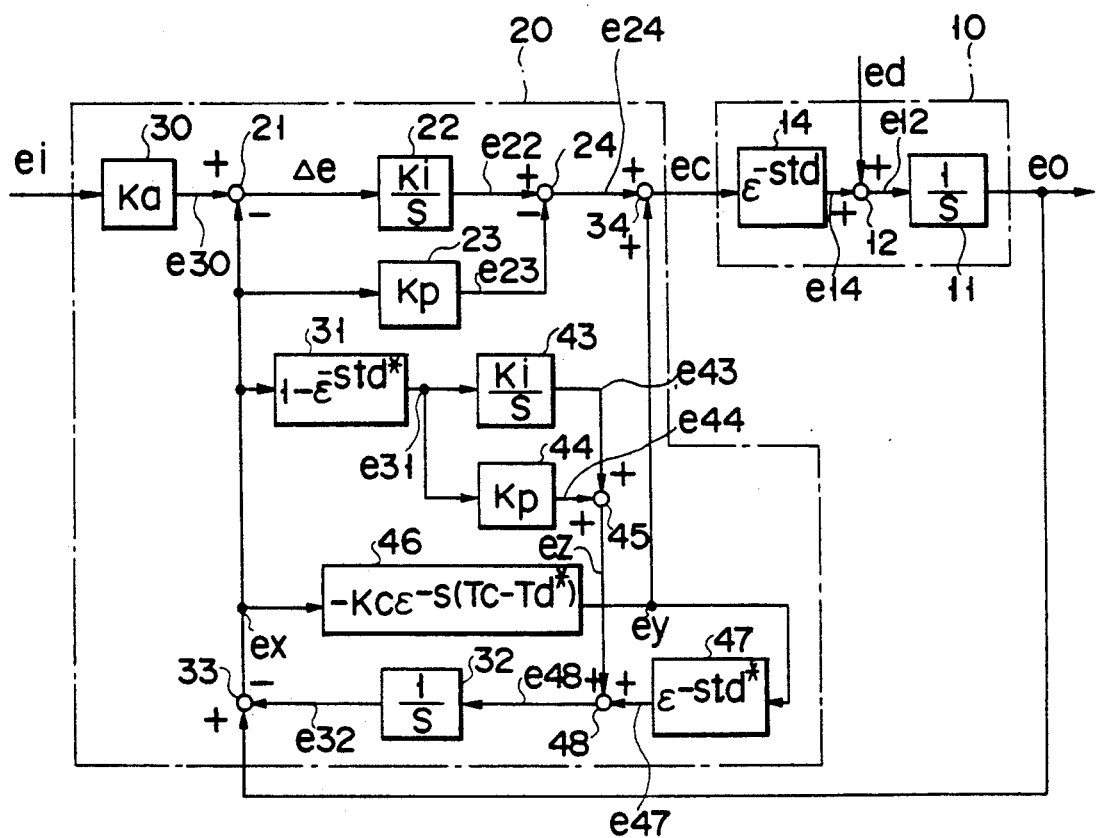
F I G. 10

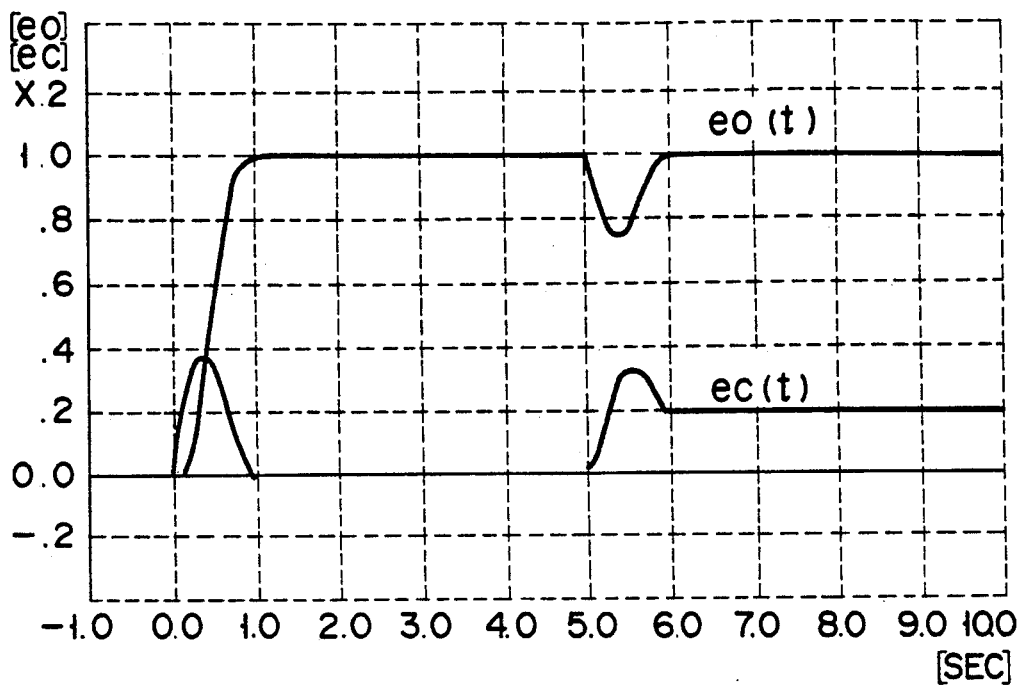
F I G. 11
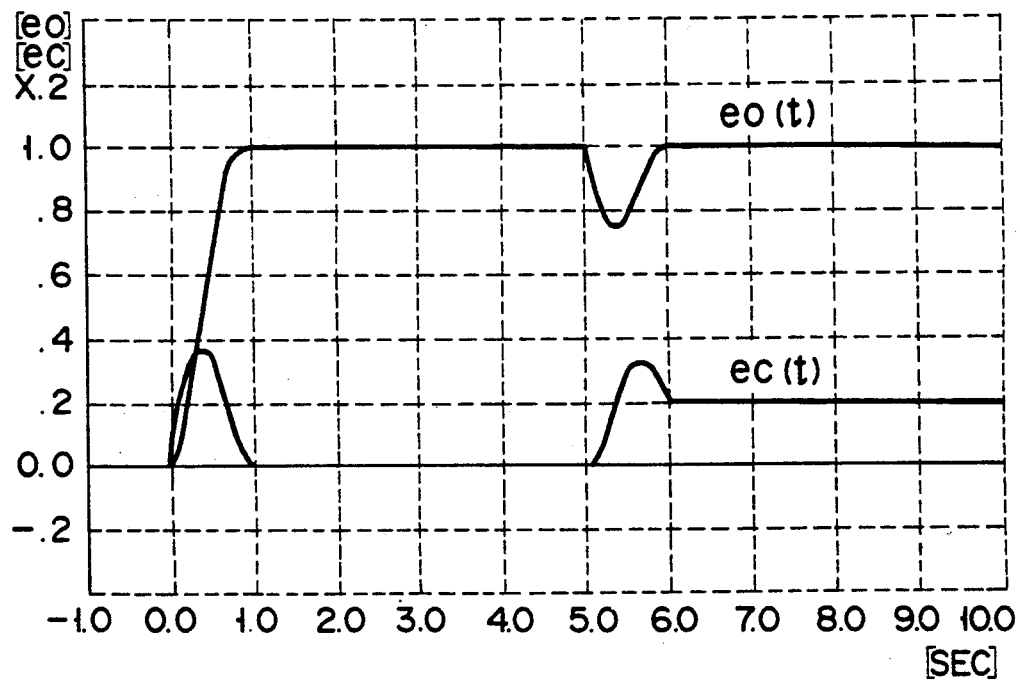
F I G. 12

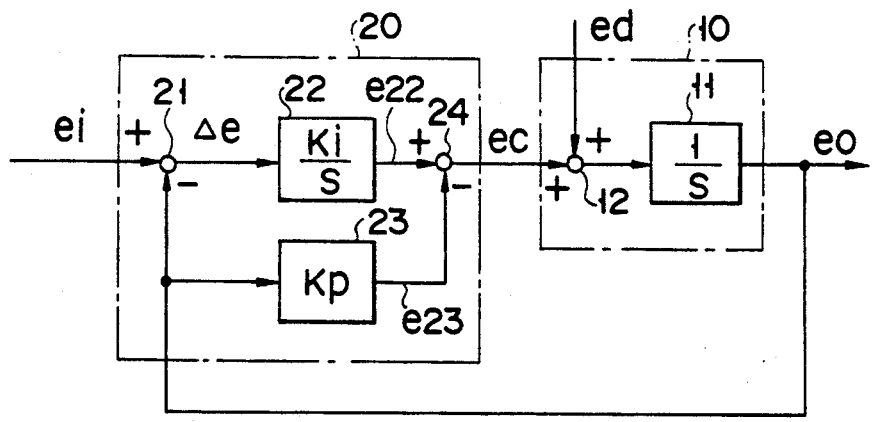
F I G. 13
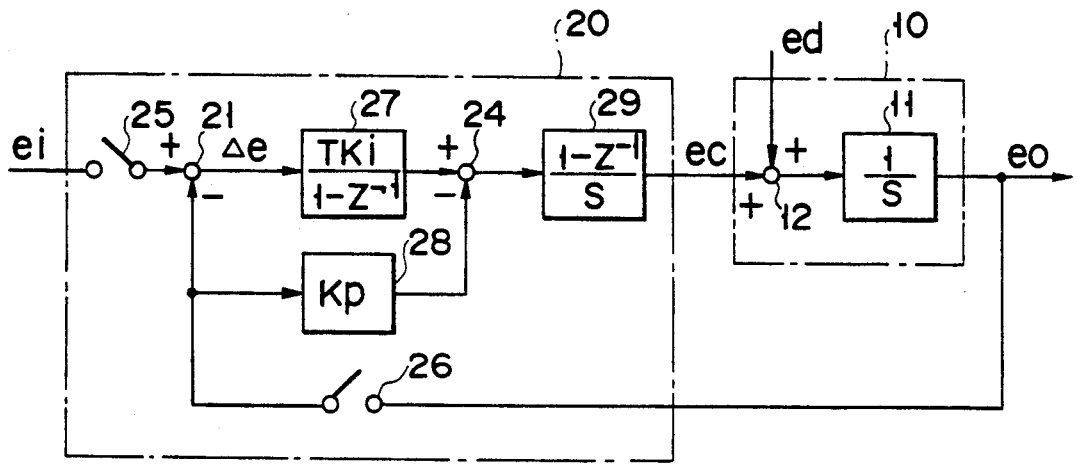
F I G. 16
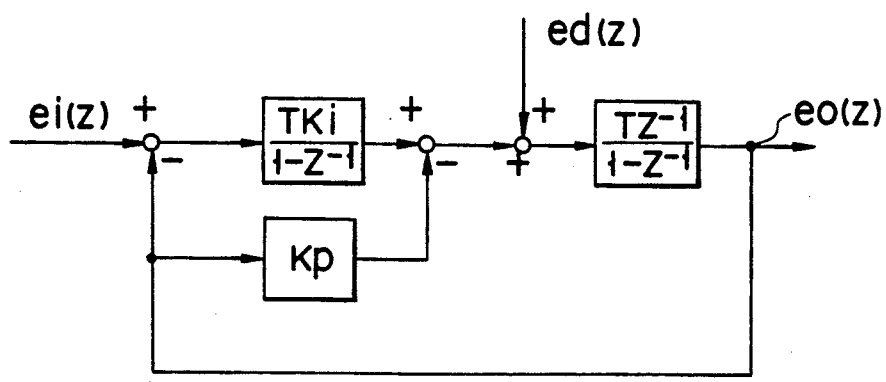
F I G. 17

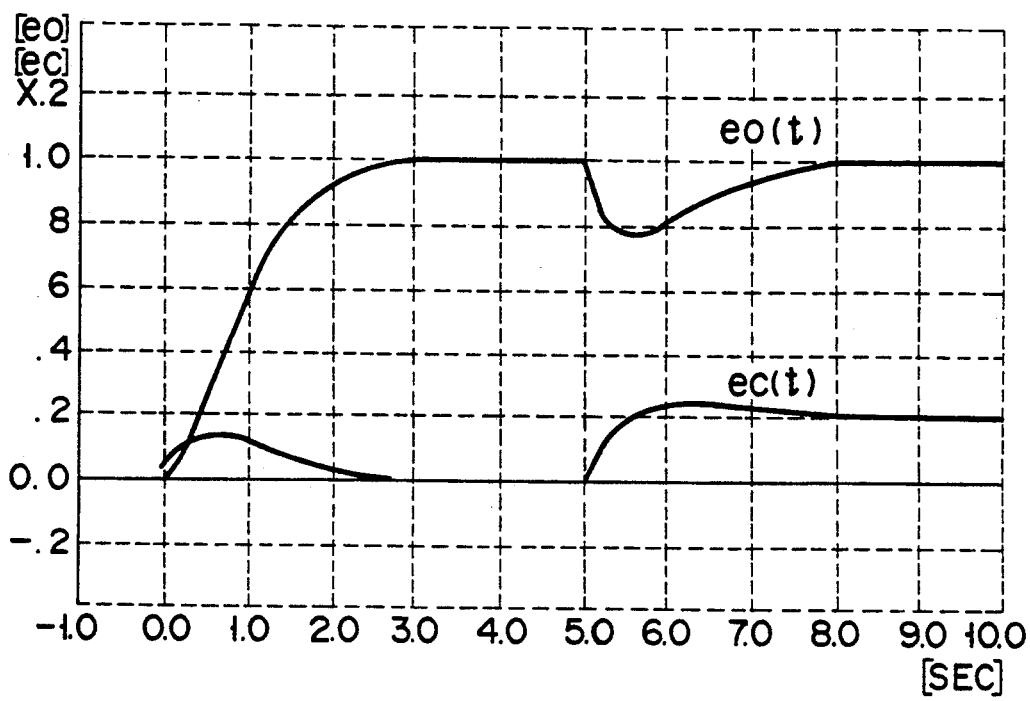
F I G. 14
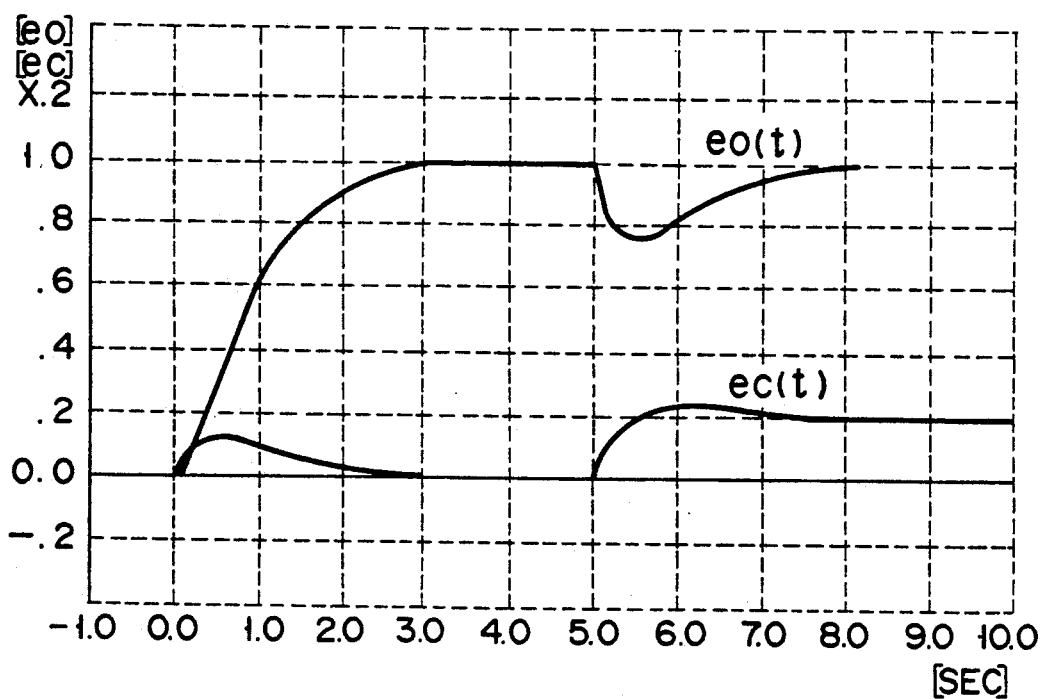
F I G. 15

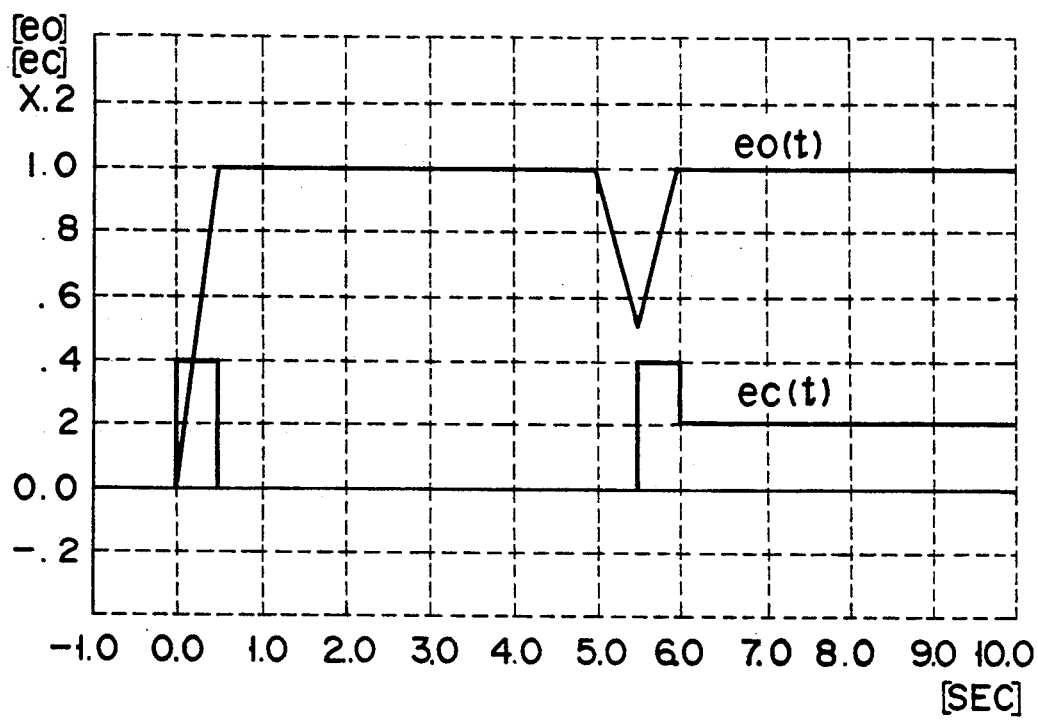
F I G. 18
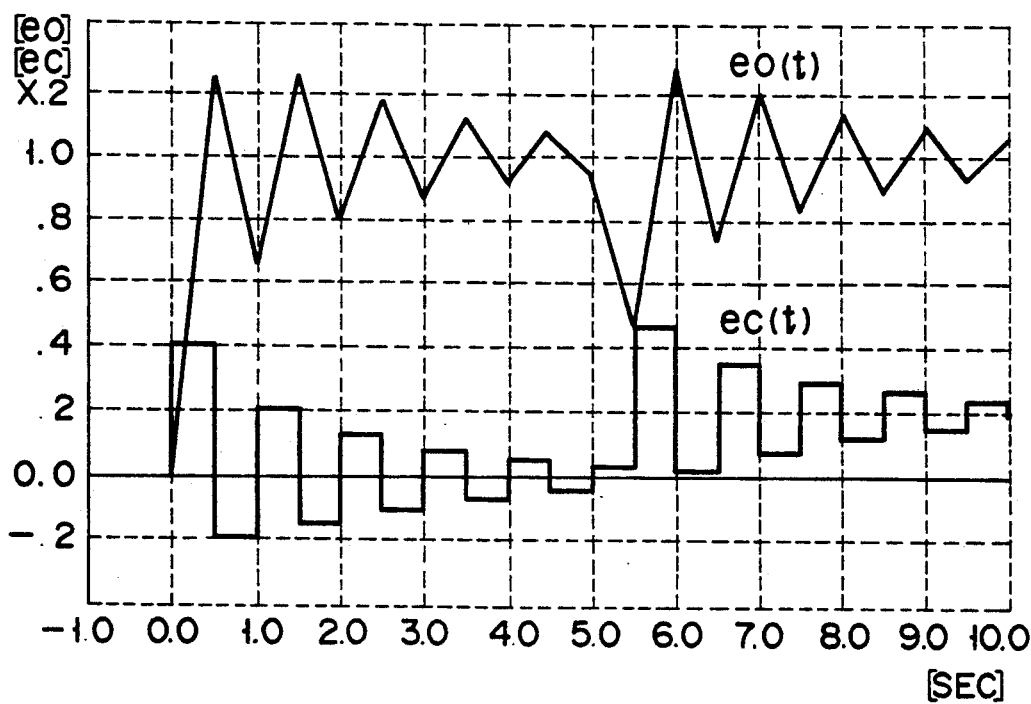
F I G. 19

CONTINUOUS DEADBEAT CONTROL SYSTEM WITH FEEDBACK CONTROL

BACKGROUND OF THE INVENTION

1. Field of the Invention

The present invention relates to a feedback control system which controls the output of a controlled object according to a control variable command.

2. Description of the Related Art

Feedback control has so far been applied to control the output of a controlled object in response to each of control variable commands. The control computation unit devised to undertake feedback control renders service in two different types—an analog computation type using an operational amplifier, and a digital computation type wherein a microcomputer or the like is utilized. Feedback control through analog computation is characterized by serial control computation in response to the command of a controlled variable or the signal thereof to be feedback. In view of this, analog computation-combined feedback control is otherwise called a continuous-time system. Meanwhile, digital computation-introduced feedback control is implemented via control computation in response to the signal sampled at a certain interval of time out of some controlled variable signals. Therefore, the latter feedback control is referred to as sampled data system control.

A continuous-time system undergoes an inconvenience in that the time required before the controlled output gets settled after the occurrence of a control variable command fluctuation and/or a disturbance, that is, the settling time, is long. Meanwhile, the control referred to above provides an advantage that the response characteristic thereof is hardly subject to change regardless of parametral fluctuations of a controlled object.

Now, with sampled data control, it is practical to settle the controlled variable within a finite time. However, the control remarked above concurs with a stepwise change of a manipulated variable, whereby an unfavorable consequence is brought about to the controlled object involved. Assuming the case of motor control, if there is witnessed a large magnitude in the stepwise change of a manipulated variable command, a machine, the load coupled to the motor concerned will experience intensive shocks.

Further, with sampled data control, control computation is effected, following the signal just sampled by a sampler. Such being the case, if the signal from a control variable detector for feeding back the control variable at the instant of signal sampling comes to carry noises (external disturbance), control performance is affected greatly by the disturbance.

Furthermore, where integral gain Ki, proportional gain Kp, and so forth of the control computation unit are optimally selected for the controlled object involved, it is feasible to settle the controlled variable within a finite time. But in the event the proper relationship between a selected control gain and the controlled object concerned is lost due to some change on the part of the controlled system, controllability declines greatly, let alone becoming incapable of showing a finite time-settling response.

To cope with the above-quoted problem, it is conceivable that the interval of sampling is decreased so that the controlled variable will be settled through a relatively large number of samplings, thereby to fabricate such a control system robust against parametral fluctuations of the controlled object involved. This, however, results in rendering the control computation unit configuration complex, with the number of parameters (gains) requiring adjustment within the control computation unit being increased. Moreover, such a system will therefore not allow ease of realization.

SUMMARY OF THE INVENTION

The object of the present invention is to provide a feedback control system devised with the above-remarked points well reflected, featuring not only smoothness of a continuous-time system as well as robustness against parametral fluctuations of the control system but also capability of finite time-settling with sampled data control.

The present invention has a control computation unit of which the feedback control system is comprised, added with a delay element plus the integration and proportional elements which have so far been applied. The delay time of this delay element depends either on settling time (namely, the time for the control variable to follow changes in the control variable command) or the time at which the control variable is restored to the value given by the control variable command when the controlled object has gone through an external disturbance. In other words, in case the control computation unit, the controlled object and/or the control variable detector are confronting a computation delay time, a dead time, and a detection delay time, respectively, then the delay element's delay time is selected as being equal to each of the above or the sum of these delay times.

The present invention wherein the control computation unit has a delay element with the delay time equal to the time of basic settling added, is thus characterized by an additional function to negate the response which, according to a conventional control, is inclined to continue after the time until which due settling is desired to be completed, whereby the control computation unit is allowed to settle the response at the timing coinciding with the time of necessary timing.

Thus, the application of the present invention for a continuous-time system enables to realize finite settling-time response control which is a feature of sampled data control. Meanwhile, use of the present invention for sampled data control renders practicable to achieve the control not only smoothness, but also against parametral fluctuations, which is a technical feature of a continuous-time system, with finite time-settling control maintained serviceable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a block diagram showing one basic configuration of the feedback control system of the present invention;

FIG. 1B is a block diagram showing another configuration of the feedback control system of the present invention;

FIG. 2 is a system configurational diagram showing one preferred embodiment of the present invention;

FIG. 5 is a system configurational diagram showing a second preferred embodiment of the present invention;

FIG. 6 shows a response waveform of the second preferred embodiment of the present invention;

FIG. 7 is another response waveform concurring with the occurrence of a parametral fluctuation of the second preferred embodiment of the present invention;

FIG. 10 is a system configurational diagram presenting a fourth preferred embodiment of the present invention;

FIGS. 11 and 12 present a response waveform of the fourth preferred embodiment of the present invention;

FIG. 13 is a configurational diagram of a continuous-time system;

FIG. 14 is a response waveform illustrated in FIG. 13;

FIG. 15 is a response waveform matching the case with a parametral fluctuation in the continuous-time system quoted in FIG. 13;

FIG. 16 is a configurational diagram of sampled data control;

FIG. 17 is a diagram illustrating the configuration of the sampled data system control presented in FIG. 16;

FIG. 18 is the response waveform illustrated in FIG. 16; and

FIG. 19 is a response waveform coinciding with the occurrence of the parametral fluctuation shown in FIG. 16.

DETAILED DESCRIPTION OF THE PREFERRED EMBODIMENTS

Figure 3:
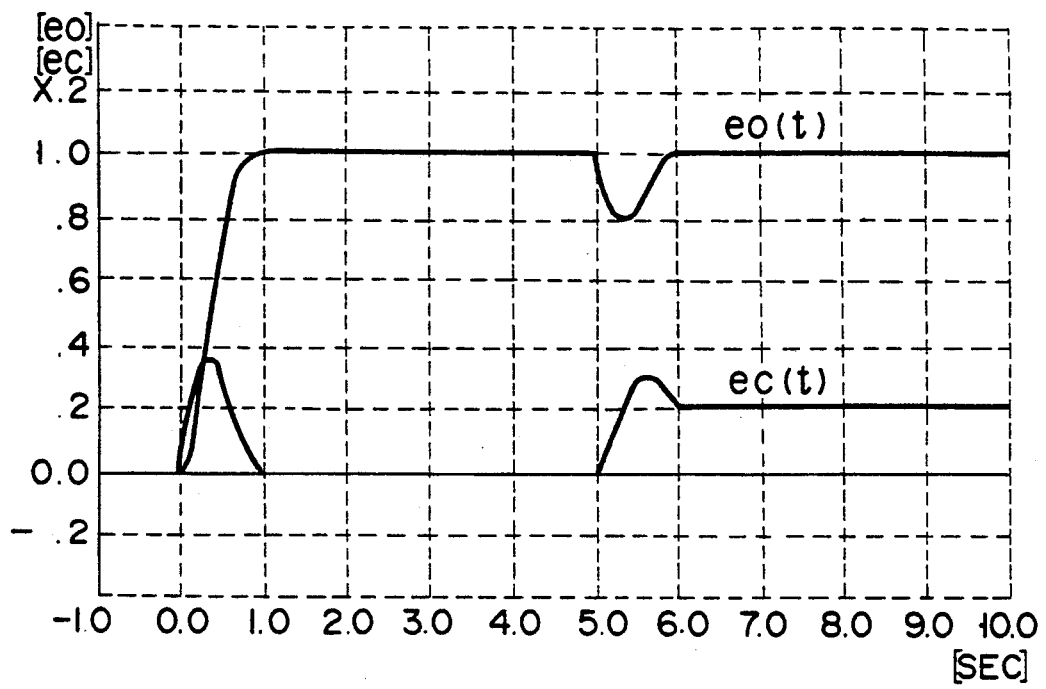
FIG. 3 is a response waveform which the preferred embodiment of the present invention exhibits.

Prior to the start of describing the preferred embodiments of the present invention, reference is made to a continuous-time system and sampled data control.

Presented in FIG. 13 is an instance of a simple continuous-time system wherein a controlled object 10 is embodied in an integrator 11 (1/s: s is a variable of the Laplace transformation). In practice, a continuous-time system comes in with a case where the level of water in a tank is controlled with a flow of water corresponding to a manipulation variable command ec maintained, wherein the controlled object is embodied in a water tank, or another case where the speed of a motor is controlled by the supply of a current complying with the manipulation valuable command ec kept on, wherein the controlled object is a motor.

In the former case, a disturbance ed is the flow of water consumed from the water tank while in the latter case, the disturbance coincides with a load torque working on the motor. Commonly in these cases, the disturbance so behaves that it is added to the manipulation variable command ec, the sum being given by an adder 12.

It is assumed that a control computation unit 20 implements a computation for so-called I-P control which has thus far been applied in combination of an integration element I and a proportional element P. For the simplicity of description, a control variable detector to detect a control variable is omitted; provided, the detection gain of this detector is assumed to be 1.

In the computation referred to above, a difference $\Delta e$ between a control variable command ei and a controlled variable eo, i.e., a feedback signal, is calculated by a subtracter 21. Successively, the calculated difference $\Delta e$ goes through integral amplification in integral amplifier 22 with an integral gain of Ki. Further, the difference between an output e22 of the integral amplifier and a signal e23 with its controlled valuable eo, multiplied by a proportional amplifier 23 as much times as a proportional gain Kp, is calculated as the manipulation valuable command ec by a subtracter 24, whereby the controlled object 10 is manipulated according to the manipulation variable command ec.

Assuming that the transfer function of the controlled variable eo to the control variable command ei is a command transfer function Gc(s), followed by calculating thereof, an expression (1) is obtained as follows:

$$Gc(s) = \frac{eo(s)}{ei(s)} = \frac{\frac{Ki}{s^2}}{1 + \left(Kp + \frac{Ki}{s}\right)\frac{1}{s}} = \frac{Ki}{s^2 + Kps + Ki} \quad (1)$$

where
ei(s): An outcome from the Laplace transformation of the control variable command
eo(s): An outcome from the Laplace transformation of the controlled variable Assuming that the control variable command ei(s) is a unit step function (1/s), the controlled variable eo(s) is calculated, following an expression (2) below:

$$eo(s) = Gc(s)\frac{1}{s} = \frac{Ki}{s(s^2 + Kps + Ki)} \quad (2)$$

Calculating a time response eo(t) through inverse Laplace transformation brings forth an expression (3) or (4).

$L^{-1}$: A symbol denoting inverse Laplace transformation $$eo(t) = L^{-1}\frac{Ki}{s(s^2 + Kps + Ki)} \quad (3)$$
$$= 1 - \frac{1}{\sqrt{Kp^2 - 4Ki}}(S_2 \epsilon^{-S_1 t} - S_1 \epsilon^{-S_2 t})$$

Provided, the following takes place when $Kp2 - 4Ki \geq 0$:

$$S_1 = \frac{Kp - \sqrt{Kp^2 - 4Ki}}{2} \quad (4)$$

$$S_2 = \frac{Kp + \sqrt{Kp^2 - 4Ki}}{2}$$

Or

-continued $$eo(t) = 1 - \epsilon^{-\frac{Kp}{2}t}\left(\cos\omega t + \frac{Kp}{2\omega}\sin\omega t\right)$$

Provided, the following goes with $Kp^2 - 4Ki < 0$:

$$\omega = \sqrt{Ki - \frac{Kp^2}{4}}$$

Similarly to the above, assuming that the transfer function of the controlled variable eo to the disturbance ed is a disturbance transfer function Gd(s) with calculating Gd(s) to follow entails expression (5) below:

$$Gd(s) = \frac{eo(s)}{ed(s)} = \frac{\frac{1}{s}}{1 + \left(Kp + \frac{Ki}{s}\right)\frac{1}{s}} = \frac{s}{s^2 + Kps + Ki} \quad (5)$$

where
ed(s): An outcome of Laplace transformation of the disturbance ed

Assuming that the disturbance ed(s) is a unit step function (1/s), a controlled variable eo(s) is calculated according to expression (6) below:

$$eo(s) = Gd(s)\frac{1}{s} = \frac{1}{s^2 + Kps + ki} \quad (6)$$

Calculating the time response eo(t) through inverse Laplace transformation draws expression (7) or (8) below:

$$eo(t) = L^{-1}\frac{1}{s^2 + Kps + Ki} \quad (7)$$

$$= \frac{1}{\sqrt{Kp^2 - 4Ki}}(\epsilon^{-S1t} - \epsilon^{-S2t})$$

where
$L^{-1}$: A symbol standing for inverse Laplace transformation
Provided, the following takes place when $Kp2 - 4Ki \geq 0$:

$$S_1 = \frac{Kp - \sqrt{Kp^2 - 4Ki}}{2} \quad (8)$$

$$S_2 = \frac{Kp + \sqrt{Kp^2 - 4Ki}}{2}$$

Or $$eo(t) = \frac{1}{\omega}\epsilon^{-\frac{Kp}{2}t}\sin\omega t$$

Provided, $Kp^2 - 4Ki < 0$ coincides with the following:

$$\omega = \sqrt{Ki - \frac{Kp^2}{4}}$$

As is clear from the expression (3), (4), (7), and (8), in each of the above-quoted cases, the controlled variable eo(t) includes a negative exponential function ($\epsilon^{-xt}$: x is a positive coefficient) to time t. To settle the controlled variable eo equally to the control variable command ei, following some changes in the control variable command ei and the disturbance ed, theoretically, an infinite time is required. Practically, it does not matter even if there is no perfect agreement between a control variable command and a controlled variable. Considering how long it will be required before they become approximately equal to each other, it is found that much time is necessary.

FIG. 14 shows typical response waveforms. They are of the controlled variable eo(t) and the manipulation variable ec(t) available int he case where the control variable command ei stepwise changes from 0 to 1 at the time t=0 second, and the disturbance ed varies from 0 to $-1$ at the time t=5 seconds, wherein the proportional gain Kp and the integration gain Ki are settled respectively to 3 so that the respective response waveforms will incur almost no oscillation.

As in the foregoing, the continuous-time system necessitates a longer settling time. On the other hand, however, it features that the response is relatively less hard to suffer a change nevertheless there occurs a parametral fluctuation of the controlled object involved.

Presented in FIG. 15 are the response waveforms in the case where the controlled object concerned which is represented by an integrator of a unit gain has had its parameter of inverse Laplace transformation varied 25% from 1/s to 1.25/s. The conditions of measuring the response waveforms in FIG. 15 are the same as those for the measurement of the typical response waveforms given in FIG. 14. FIG. 15 shows that the waveforms are insensitive to variations in the parameter.

Even where both the control computation unit 20 and the controlled object 10 are different from those in FIG. 13, the response to the controlled variable eo includes a negative exponential function ($\epsilon^{-xt}$) for the time t. With this in view, it is said that the same as illustrated in FIG. 13 takes place.

Sampled data control goes into service in two different modes—a finite settling control and a deadbeat control mode; with sampled data control applied, it is feasible to settle the response to the controlled variable for the time, an integer-multiple of the period of sampling when there occurs some change in the control variable command and the disturbance.

Similarly to the case of a continuous-time system illustrated above, FIG. 16 illustrates an instance of simple sampled data control wherein the controlled object concerned is given by an integrator (1/s). $Z^{-1}$ denotes a dead time $\epsilon^{-ST}$, where T represents a sampling period. The control computation unit 20 comprises samplers 25 and 26 each to obtain the control variable command ei and a sampled data signal of the controlled variable eo, which is otherwise referred to as a feedback signal, subtracters 21 and 24, an integrating amplifier 27 for integrating computation, proportional computation, and sampled data computation, proportional amplifier 28, and a sample holder 29 outputting data of time-discontinuity which are through with sampled data computation to the controlled object 10 as a serial manipulation variable commands.

FIG. 17 presents the consequence of Z-transformation implemented to analyze a sampled data control system, where ei(z), eo(z), and ed(z) are the respective outcomes from Z-transformation of the control variable command ei, controlled variable eo, and disturbance ed. Assuming that the pulse transfer function of a controlled variable eo(z) to a control variable command ei(z) a command pulse transfer function Gc(z) with figuring out thereof to follow gives expression (9) below:

$$Gc(z) = \frac{eo(z)}{ei(z)} = \frac{\frac{T^2 KiZ^{-1}}{(1 - Z^{-1})^2}}{1 + \left(Kp + \frac{Tki}{1 - Z^{-1}}\right)\left(\frac{TZ^{-1}}{1 - Z^{-1}}\right)} \qquad (9)$$

$$= \frac{T^2 KiZ^{-1}}{1 - \{2 - T(Kp + TKi)\}Z^{-1} + (1 - TKp)Z^{-2}}$$

Now selecting the proportional gain Kp and the integration gain Ki in the respective relations given by expressions (10) and (11) so that the denominator of expression (9) will be 1, the command pulse transfer function Gc(z) is prescribed by expression (12) below:

$$T \cdot Kp = 1 \qquad (10)$$

$$T(Kp + TKi) = 2 \qquad (11)$$

$$Gc(z) = Z^{-1} \qquad (12)$$

where
T: A sampling period

The pulse command transfer function Gc(z) given by expression (12) shows that the controlled variable eo responds to the control variable command ei with a delay of sampling period T which is specified with $Z^{-1}$, whereby control settles within one sampling period.

Likewise assuming that the pulse transfer function of the controlled variable eo(z) to the disturbance ed(z) is a disturbance pulse transfer function Gd(z), followed by figuring thereof entails expression (13) below:

$$Gd(z) = \frac{eo(z)}{ed(z)} = \frac{\frac{TZ^{-1}}{1 - Z^{-1}}}{1 + \left(Kp + \frac{TKi}{1 - Z^{-1}}\right)\left(\frac{TZ - 1}{1 - Z^{-1}}\right)} \qquad (13)$$

$$= \frac{TZ^{-1} - TZ^{-2}}{1 - \{2 - T(Kp + TKi)\}Z^{-1} + (1 - TKp)Z^{-2}}$$

Introducing the respective relations defined by expressions (10) and (11) into expression (13) results in expression (14) below:

$$Gc(z) = TZ^{-1} - TZ^{-2} \qquad (14)$$

As is clear from the above, the disturbance pulse transfer function Gd(z) is expressed in Z-1 and Z-2 Therefore, with this disturbance pulse transfer function applied, control gets settled within a time span of two sampling periods. Where the disturbance changes stepwise, the fluctuation of the controlled variable due to such a disturbance is eliminated with the controlled variable normalized within a time span equivalent to two sampling periods.

FIG. 18 shows the response waveforms in the case where the sampling period T, proportional gain Kp and integration gain Ki are set to 0.5 second, 2, and 4, respectively. These response waveforms refer to the waveforms respectively of the controlled variable eo and the manipulation variable ec in the case where control variable command ei varies stepwise from 0 to 1 at the time t=0 second, and the disturbance ed changes likewise from 0 to −1 at the time t=5 seconds.

As described above, sampled data control enables to settle the controlled variable within a finite time.

Now, referring to FIG. 1A and FIG. 1B, the basic system configuration of the present invention is described. In the system configuration of FIG. 1A, the control variable command ei is input to a subtracter (comparator) 21. The subtracter 21 feeds a difference Δe between the controlled variable eo and the control variable command ei to an adder 34, via a circuit 240 having a transfer function G(s). Subsequently, the adder 34 feeds to the controlled object 10 the sum of an output e24 of the transfer function G(s) circuit 240 and an output ey of a delay element 31 which is available with the controlled variable eo delayed by a given time. It is noted that the disturbance ed of the feedback control system is added to controlled object 10 in the present invention.

With the controlled variable output eo of the controlled object 10 negatively fed back to the subtracter 21, and subsequently added to an output e24 after the delay by a given time, the controlled variable eo settles within a finite time (this finite settling mechanism is described later).

The system illustrated in FIG. 1B is configured with a minor negative feedback loop added to the configuration in FIG. 1A. Namely, the output ey of the delay element 31 is transformed into a local feedback signal e32 via a circuit with a transfer function H(s) other than 1. At a subtracter (comparator) 33, a feedback signal ex is generated as a difference between the controlled variable eo and the local feedback signal e32. Then, the feedback signal ex is not only negatively fed back to the subtracter 21 but also added to the output e24 after the delay by a given time.

With reference to FIG. 1A or FIG. 1B, the transfer function F(s) (=Δe/ec) of the control computation unit 20 is a "proper function" which means to that the degree sa of a complex parameter s of the denominator of the expression which denotes the transfer function F(s) is equal to or more than the degree sb of a numerator's complex parameter s (sa≥sb).

Assuming that the control computation unit 20 comprises a proportional element P and an integration element I, for example, the transfer function F(s) of the control computation unit 20 becomes P+I/s=(P-s+I)/s, whereby the degree (first order) of the denominator's complex parameter s is rendered equal to the degree (first order) of the numerator's complex parameter s. This transfer function F(s) is assumed to be a proper function in the specification of the present invention.

Where the transfer function F(s) of the control computation unit 20 is assumed as (Ps+I)/s², with the degree (second order) of the denominator's complex parameter s surpassing the degree (first order) of the numerator's complex parameter s, this transfer function is also regarded as a proper function in this specification.

Incidentally, to ensure finite settling in the response to the system of FIG. 1A, the transfer function G(s) of the circuit 240 should have an element of dead time or delay time.

Further, according to the configuration of FIG. 1B, the finite settling can be achieved even if the input ei is applied to the subtracter 33, as is indicated by the broken line in FIG. 1B.

The present invention disclosed in this specification is characterized in that the control computation unit 20 is devoid of a differentiation element which is readily affected by noises but has added a parallel data processing circuit configured using a delay element 31 to lessen the time of settling the controlled variable eo.

The above-remarked system configurational feature is illustrated hereunder through the introduction of some preferred embodiments well depicting the present invention.

(1st Preferred Embodiment)

Presented in FIG. 2 is the 1st preferred embodiment of the present invention which is based on the system configuration in FIG. 1B. In this embodiment, the controlled object 10 is given by an integrator, likewise in the preferred embodiment shown in FIG. 13, wherein the controlled object 10 is otherwise given by an integrator 11 and an adder 12 which is subjected to the disturbance ed. The control computation unit 20 includes subtracters 21 and 24, an integrating amplifier 22, and a proportional amplifier 23, all of which are the same configurational element as presented in FIG. 13. The numeral 30 stands for a proportional amplifier, 31 for a delay element, 32 for an integrating amplifier, 33 for a subtracter, and 34 for an adder, these being the elements newly added to the configuration in FIG. 13.

A difference ex between the controlled variable eo detected by the control variable detector provided for the controlled object 10 (omitted from being illustrated in the figure), and the output of an integrating amplifier 32 is figured out by a subtracter 33. The calculated difference e is input not only to the subtracter 21 but also to the proportional amplifier 23 and the delay element 31.

As specified in the figure, the delay element 31 has a transfer function $[Kd(1-\epsilon^{-STc})]$ including another transfer function $\epsilon^{-STc}$ associated with a delay (dead) time. The output ey from the delay element 31 is of a proportional gain Kd-multiple of the difference between an input "1" applied to the delay element, and an input likewise applied to the delay element with a delay Tc provided (the latter input being otherwise defined as an input $\epsilon^{-STc}$ which is a past event by time Tc). The delay time Tc is selected equal to the time necessary for settling the controlled variable eo.

The output ey of this delay element is input to the integrator 32 while the control computation unit 20 has a loop fabricated with the delay element 31 and the integrating amplifier 32.

The control variable command ei is multiplied as much as Ka, a proportional gain by the proportional amplifier. An output e30 of this proportional amplifier 30 is input to the subtracter 21 in which the difference Δe between the output ex of the subtracter 33 and the output e30 is figured out. Further, the difference Δe goes through integrating amplification by the integrating amplifier with the integrating gain Ki. From an output e22 of this integrating amplifier 22, e23, a proportional gain Kp-multiple so amplified of a differential signal ex by the proportional amplifier is subtracted. Moreover, by an adder 34, the output ey of the delay element 31 is added to the consequence of the above subtraction, whereby the manipulation variable command ec is calculated. The controlled object 10 is operated according to the manipulation variable command ec just calculated.

Figuring out a command transfer function Gc(s), the transfer function of the controlled variable eo to the control variable command ei leads to establishing expression (15) below:

$$Gc(s) = \frac{eo(s)}{ei(s)} = Ka \frac{\frac{Ki}{s^2}}{1 + \frac{Kp + \frac{Ki}{s} - Kd(1 - \epsilon^{-STc})}{s + Kd(1 - \epsilon^{-STc})}} \quad (15)$$

$$= KaKi \frac{s + Kd(1 - \epsilon^{-STc})}{s(s^2 + Kps + Ki)}$$

Further calculating a disturbance transfer function Gd(s), the transfer function of the controlled variable eo to the disturbance ed draws expression (16) below:

$$Gd(s) = \frac{eo(s)}{ed(s)} = \frac{\frac{1}{s}}{1 + \frac{Kp + \frac{Ki}{s} - Kd(1 - \epsilon^{-STc})}{s + Kd(1 - \epsilon^{-STc})}} \quad (16)$$

$$= \frac{s + Kd(1 - \epsilon^{-STc})}{s(s^2 + Kps + Ki)}$$

Comparing expression (15) and (16) with each other is followed by the finding that the relationship given by expression (17) below exists:

$$Gc(s) = Gd(s) \frac{KaKi}{s} \quad (17)$$

The time response of the controlled variable eo to the control variable command ei can be calculated by being multiplied with a coefficient (KaKi), following time-integrating the time response of the controlled variable eo in the case where the controlled object undergoes the disturbance ed of the same function as that of the control computation unit. Therefore, if the time response to the disturbance is feasible Tc time after, the time response to the controlled variable command remains unchanged Tc time after, whereby both the time response to the disturbance and the time response to the control variable command can be settled within a finite time Tc.

Assuming that the disturbance ed(s) is a unitary step function (1/s), a controlled variable eo(s) is obtained according to expression (18) below:

$$eo(s) = Gd(s) \frac{1}{s} = \frac{s + Kd(1 - \epsilon^{-STc})}{s(s^2 + Kps + Ki)} \quad (18)$$

$$= \frac{1}{s^2 + Kps + ki} + \frac{kd(1 - \epsilon^{-STc})}{s(s^2 + Kps + Ki)}$$

Next, a time response eo(t) is figured out through inverse Laplace transformation. Considering that inverse Laplace transformation brings the term $\Delta^{31} STc$ to 0 as long as there exists the relationship $0 \leq t \leq Tc$, expression (19) is established while expression (20) concurs with the relationship $t > Tc$. Namely, in the relationship $0 \leq t \leq Tc$, $$eo(t) = \quad (19)$$

$$\epsilon^{-\frac{Kp}{2}t} \left\{ \frac{1}{\omega} \sin\omega t - \frac{Kd}{Ki} \cos\omega t - \frac{KpKd}{2Ki} \sin\omega t \right\} + \frac{Kd}{Ki}$$

where $$\omega = \sqrt{Ki - \frac{Kp^2}{4}}$$

On the other hand, in the relationship $t > Tc$, $$eo(t) = \epsilon^{-\frac{Kp}{2}t}\left(\frac{1}{\omega}\sin\omega t - \frac{Kd}{Ki}\cos\omega t - \frac{KpKd}{2Ki\omega}\sin\omega t\right) + \frac{Kd}{Ki} - \epsilon^{-\frac{Kp}{2}(t-Tc)}\left(-\frac{Kd}{Ki}\cos\omega(t-Tc) - \frac{KpKd}{2Ki\omega}\sin\omega(t-Tc)\right) + \frac{Kd}{Ki}$$

$$= \epsilon^{-\frac{Kp}{2}t}(\alpha\sin\omega t + \beta\cos\omega t) \quad (20)$$

Provided, $$\alpha = \frac{1}{\omega} - \frac{KpKd}{2Ki\omega} + \frac{Kd}{Ki}\epsilon^{\frac{KpTc}{2}}\sin\omega Tc + \frac{KpKd}{2Ki\omega}\epsilon^{\frac{KpTc}{2}}\cos\omega Tc$$

$$\beta = -\frac{Kd}{Ki} + \frac{Kd}{Ki}\epsilon^{\frac{KpTc}{2}}\cos\omega Tc + \frac{KpKd}{2Ki\omega}\epsilon^{\frac{KpTc}{2}}\sin\omega Tc$$

Adjusting parameters Kp, Kd, Ki, and Tc in a manner that both the coefficient α of αsinωt within the bracket of the right side of expression (20) with respect to the time response eo(t) and a coefficient β of βcosωt will become 0, results in rendering the time response eo(t) maintainable always at 0 under the condition with the relationship $t > Tc$. Namely, for a stepwise change of the disturbance ed, the controlled variable eo exhibits, until Tc time, the time response eo(t) given by expression (19) which complies with the disturbance. However, the time response conforming to the disturbance becomes 0 after Tc time, thereby the time response can be settled within a finite time equal to the delay time Tc of the delay element 31.

Also, the time response of the controlled variable eo in the case where the control variable command ei varies following the unitary step function, gets through with changing by the time Tc according to the relationship of expression (17), and thereafter (after the elapse of Tc time), the time response remains unchanged with the time Tc getting fixed, whereby the time response of the controlled variable eo can therefore be settled within a finite time.

Figuring out how much is the value at which the controlled variable eo gets settled when the control variable command ei is added with the unitary step function (1/s) out of the command transfer function Gc(s) shown by expression (15), according to the final value theorem draws expression (21) below:

$$\lim_{t \to \infty} eo(t) = \lim_{s \to 0} s \cdot KaKi\left(\frac{s + Kd(1 - \epsilon^{-STc})}{s(s^2 + Kps + Ki)}\right) \cdot \frac{1}{s}$$

$$= \lim_{s \to 0} KaKi \frac{1 + \frac{Kd(1 - \epsilon^{-STc})}{s}}{s^2 + Kps + Ki}$$

$$= Ka(1 + kdTc) \quad (21)$$

Therefore, setting Ka so that it will meet the relationship of expression (22) renders practicable to undertake such control wherein the control variable command and the controlled variable are made equal to one another.

$$Ka = (1 + KdTc)^{-1} \quad (22)$$

The range of adjusting the proportional gain Kp, integration gain Ki, delay time Tc, and delay element's gain Kd so that the coefficient α of αsinωt and the coefficient β of βcosωt within the bracket of the right side of expression (20) is limitless. Given hereunder is one instance showing the respective values to which Kd, Ki, and Ka are adjustable, with the time desired for settling the controlled variable assumed as 1 second, delay time Tc also assumed as 1 second, and proportional gain Kp supposed as 2 identical with the proportional gain of sampled data control presented in FIG. 18.

With $Tc = 1$ second and $Kp = 2$ assumed.
Kd = 1.820025154
Ki = 24.8037447
$Ka = (1 + KdTc)^{-1} = 0.354606766$ FIG. 3 indicates the response waveforms variable with the above-quoted respective gains in the 1st preferred embodiment of the present invention. These response waveforms refer to the waveforms respectively of a control variable eo(t) and a manipulation variable command ec(t) in the case where the control variable command ei changes stepwise from 0 to 1 at the time $t = 0$ second and the disturbance ed varies likewise from 0 to $-1$ at the time $t = 5$ seconds, wherein the time of settling the control variable selected at 1 second equal to the delay time Tc for the respective changes of the control variable command ei and disturbance ed.

Figure 4:
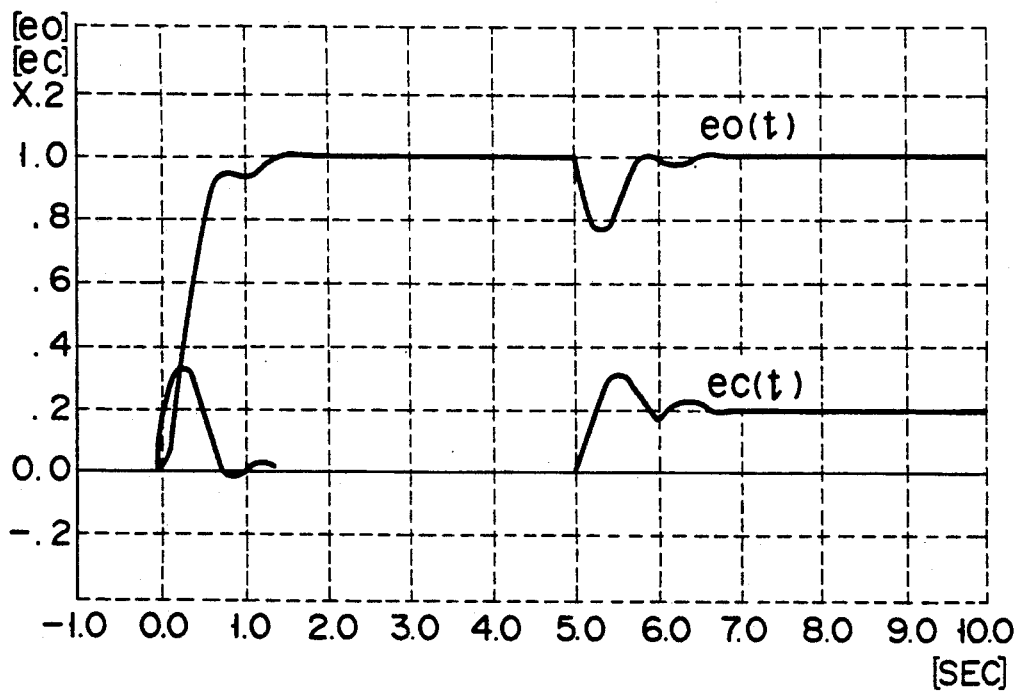
FIG. 4 is another response waveform coinciding with the occurrence of a parametral fluctuation of the preferred embodiment of the present invention.

FIG. 4 shows the response waveforms in the case where the controlled object—an integrator of a unit gain—has had its parameter of inverse Laplace transformation varied 25% from 1/s to 1.25/s. The conditions of measuring the response waveforms in FIG. 4 are the same as those for the measurement of the response waveforms illustrated in FIG. 3. Compared with the alteration in control response from FIG. 18 to FIG. 19 in the case of finite settling control in sampled data control, the deterioration which the 1st embodiment of the present invention experiences over control response, is less with its robustness or proofness as available in a continuous-time system against parametral fluctuations remaining unchanged.

As in the foregoing, according to the preferred embodiment of the present invention, the continuous-time system enables to settle the control response to a control variable command and a disturbance within a finite time. Thus, the embodiment makes it feasible to implement the control which is characterized by such smoothness of performance and robustness against parametral fluctuations of the control system as available in the continuous-time system, as well as by such capability of finite-time settling the controlled variable as obtainable in sampled data control.

(2nd Preferred Embodiment)

FIG. 5 shows a system configuration of the 2nd preferred embodiment of the present invention. The 1st preferred embodiment illustrated in FIG. 2 is an instance of a continuous-time system while the 2nd preferred embodiment given in FIG. 5 is another instance of sampled data control.

The controlled object 10 in this preferred embodiment is of such a system configuration as includes an integrator 11 and comprises an adder 12 which suffers the disturbance ed, in addition to the integrator. A control computation unit 20 includes samplers 25 and 26 to provide the sample data signals respectively of the control variable command ei for sampled data control, and the controlled variable eo, a feedback signal, subtracters 21 and 24, an integrator 27, a proportional amplifier 28, and a sample holder 29. The system configuration of the 2nd preferred embodiment is identical with that presented in FIG. 16 as an example of sampled data control. The 2nd preferred embodiment of the present invention has a proportional amplifier 35, a delay element 36, an integrating amplifier 37, a subtracter 38, and an adder 39 newly added.

A difference ex between a sample data e26 of the controlled variable eo detected by a controlled variable detector (omitted from being illustrated) and an output e37 of the integrating amplifier 37 is calculated by the subtracter 38. The calculated difference ex is input not only to the subtracter 21 but also to the proportional amplifier 28 and the delay element 36. As illustrated in the figure, the delay element 36 keeps a transfer function $[Kd(1-Z^{-n})]$ including a pulse transfer function $Z^{-n}$ which denotes a delay time (dead time) component, the n-multiple (n: an integer) of an sampling period T. An output ey of the delay element 36 is a proportional gain Kd-multiple of the difference between the input corresponding to the output ey, and the input delayed as much as a delay time nT. The delay time nT is so selected equal to the time desired for settling the controlled variable.

The output ey of the delay element 36 is negatively fed back to its input via the integrating amplifier 37 and the subtracter 38, whereby, within the control computation unit 20, a loop comprising the delay element 36 and the integrating amplifier 37 is formed.

The control variable command ei is multiplied as much as Ka, the proportional gain by the proportional amplifier 35. An output e35 of this proportional amplifier 35 is input to the subtracter 21 wherein the difference Δe between the output e35 and an output ex of the subtracter 38 is figured out. Further, the figured out difference Δe goes through integrating amplification by the integrating amplifier 27 with an integration gain Ki. From an output e27 of this integrating amplifier, a proportional gain Kp-multiple e28 of a differential signal ex which is provided by the proportional amplifier 28 is subtracted by the subtracter. An output e24 obtained through the above subtraction is added with the output ey of the delay element 36 by the adder 39. The outcome e39 of this addition is input to the sample holder wherein the individual data of time-discontinuity provided through sampled data computation are transformed into a series of signals which are subsequently output as a manipulation variable ec. The controlled object 10 is operated according to this manipulation variable command ec.

The above-illustrated system configuration is alternative of the 1st preferred embodiment of the present invention, and likewise with the 1st preferred embodiment, adjusting a proportional gain Kp, integration gain Ki, delay time nT, and a gain Kd of the delay element enables the 2nd preferred embodiment to undertake finite settling control. Presented below is one case showing the individual settings respectively of the delay element's gains Kd, integration gain Ki, and another parameter Ka, wherein the sampling interval T is selected at 0.1 second, n at 10, and the proportional gain Kp at 2 identical with that of the 1st preferred embodiment so that the delay time nT will be 1 second, the time within which finite settling control is desired. With T=0.1 second, n=10, and Kp=2, Kd=1.304976237
Ki=19.28352216
$Ka=(1+Kd\cdot nT)^{-1}=0.4338439521$ FIG. 6 shows the respective response waveforms in the 2nd preferred embodiment wherein the parameters Kd, Ki, and Ka are selected as specified above. These response waveforms refer to the waveforms respectively of the control variable eo(t) and the manipulation variable command ec(t) in the case where the control variable command ei changes stepwise from 0 to 1 at the time t=0 second, and the disturbance ed likewise alters from 0 to −1 at the time t=5 seconds. In this case, for some change of the control variable command ei, finite settling control is effected within a time of 0.9 seconds equal to the sum of 9 sampling intervals, each sampling interval being ((n−1)T), and for a certain change of the disturbance ed, finite settling control is implemented within a time of 1 second equal to the sum of 10 sampling intervals, each sampling interval being (nT).

Given in FIG. 7 are the response waveforms in the case where the controlled object—an integrator of a unit gain—has had its parameters of inverse Laplace transformation varied 25% from ½ to 1.25/s. The conditions of measuring the response waveforms in FIG. 7 are the same as those for the measurement of the response waveforms illustrated in FIG. 6. Referring to these response waveforms, it is witnessed that they exhibit the propensity almost identical with that observed in the 1st preferred embodiment.

As described above, according to the 2nd preferred embodiment of the present invention, it is practicable to implement control characterized by smoothness of performance, and such robustness as available in continuous-time system against parametral fluctuations of the control system while settling the response respectively to a certain change of the control variable command and some alteration of the disturbance within a finite time.

(3rd Preferred Embodiment)

Figure 8:
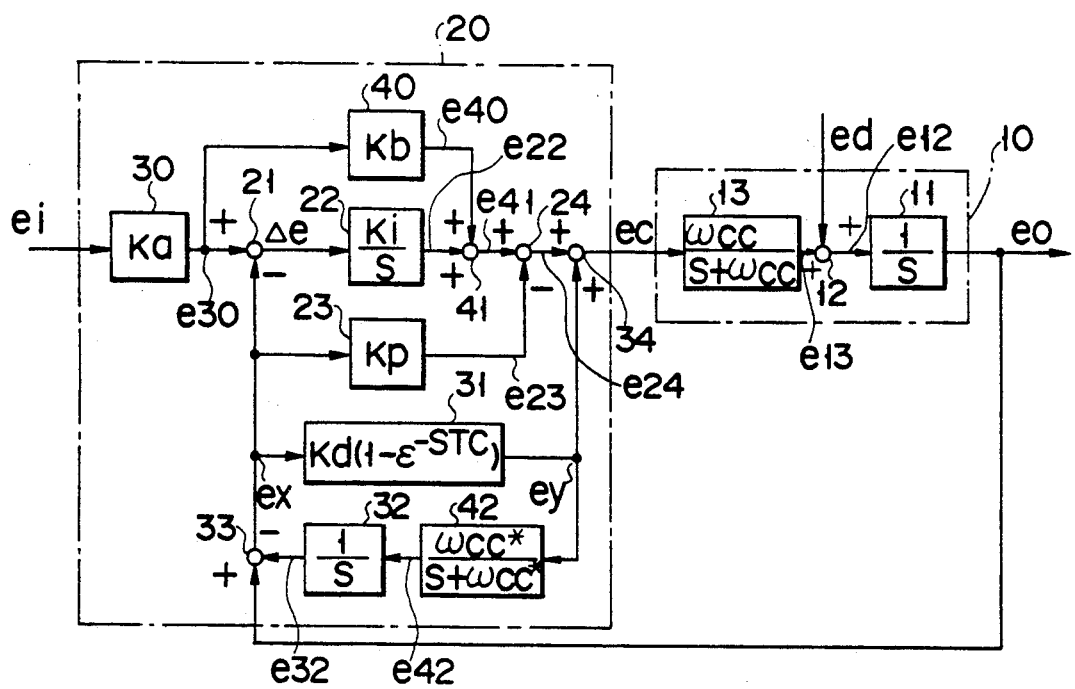
FIG. 8 is a system configurational diagram illustrating a third preferred embodiment of the present invention.

FIG. 8 illustrates the system configuration of the 3rd embodiment of the present invention. The controlled object 10 given in each of the 1st and 2nd preferred embodiments is of such a configuration that the system is represented by the integrator 11 only whereas the controlled object 10 in the 3rd preferred embodiment comprises a first order lag element 13 and the integrator 11. The controlled object 10 quoted in the 3rd preferred embodiment corresponds to such a system including a motor current control minor loop for motor speed control, wherein motor current control is implemented with the first order lag, following the manipulation variable command. The numeral 10 denotes a controlled object which comprises an integrator 11, an adder 12 which incurs the disturbance ed, and the 1st order lag element 13. The cutoff angular frequency is ωcc.

Included in a control computation unit 20 are subtracters 21, 24, and 33, an adder 34, integrating amplifiers 22 and 32, proportional amplifiers, and a delay element 31. This system configuration is the same as that of the 1st preferred embodiment. The numeral 40 stands for a proportional amplifier, 41 for an adder, and 42 for a first order lag element, all of which are newly added to the configuration of the 1st preferred embodiment to make up the 3rd preferred embodiment.

The difference between the controlled variable eo detected by a control variable detector (omitted from being illustrated) and an output e32 of the integrating amplifier 32 is figured out by a subtracter 33. The difference ex is input not only to the subtracter 21 but also to the proportional amplifier 23, and delay element 31.

The delay element 31 keeps a delay (dead) time transfer function $\epsilon^{-STc}$ included in the transfer function [Kd $(1-\Delta^{-STc})$], as shown in the figure. The output ey of the delay element 31 is a proportional gain Kd-multiple of the difference an input corresponding to the output ey and another input delayed as much as a delay time Tc. The delay time Tc is selected equal to the time within which the controlled variable of the system is desired to be settled.

The output ey of the delay element 31 is input to the integrating amplifier 32 through a first order lag element 42 with adjustment as far approximation as possible to the adjustment of the first order lag element 13 contained in the controlled object 10. Within the control computation unit 20, a loop is fabricated with the delay element, first order lag element 42, and integrating amplifier 32.

The control variable command ei is multiplied as much as Ka, a proportional gain by the proportional amplifier. The output e30 of this proportional amplifier 30 is input to the subtracter 21, wherein the difference $\Delta e$ between the output e30 and the output ex of the subtracter 33 is calculated. Further, the difference $\Delta e$ experiences integrating amplification by the integrating amplifier 22 with the integrating gain Ki.

The output e30 of the proportional amplifier 30 is also input to the proportional amplifier 40 wherein the output is multiplied as much as Kb, a proportional gain. The output e22 of the integrating amplifier 22 and the output e40 of the proportional amplifier 40 are summed up by the adder 41. From this sum-up signal of the adder 41, a proportional gain Kp-multiple e23 which the proportional amplifier 23 provides of a differential signal ex, is subtracted by the subtracter 24. Further, the output ey of the delay element 31 is added to the output e24 of the subtracter 24 by the adder 34, whereby the manipulation variable command ec is figured out. The controlled object 10 is operated according to the manipulation variable command ec just calculated above.

Though a detailed description is refrained here, it is clear that, even with the above-remarked system configuration wherein the controlled object 10 is represented by the first order lag element 13 and the integrator 11, finite settling control is feasible similarly to the case in which the controlled object is denoted only by an integrator.

Figure 9:
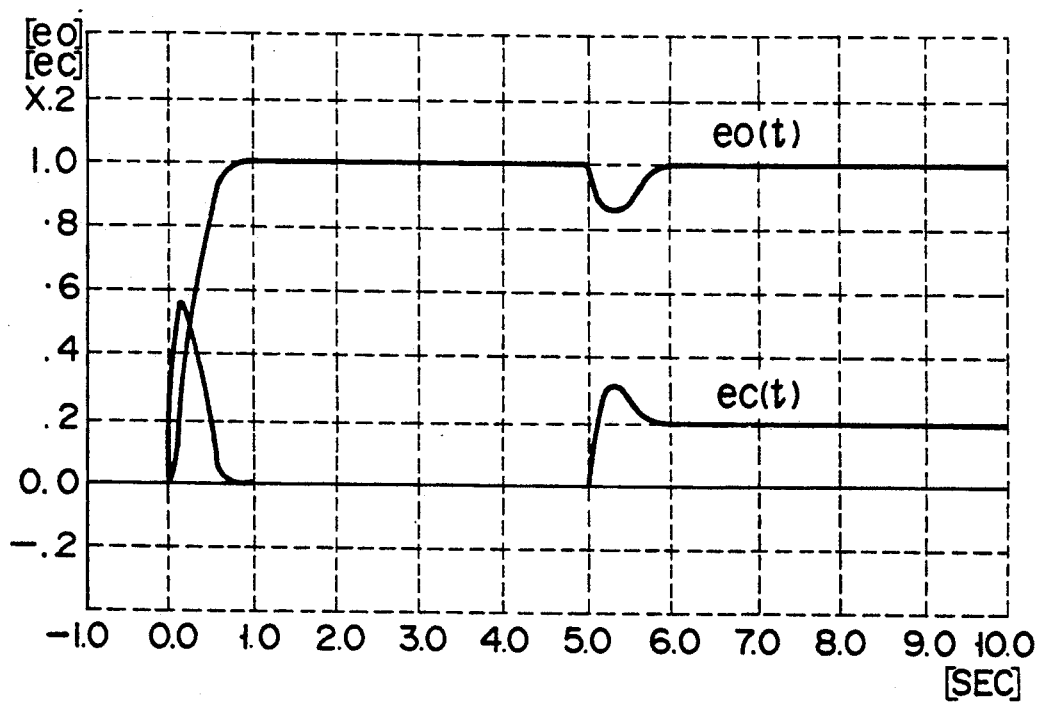
FIG. 9 is a response waveform which the third preferred embodiment of the present invention shows.

FIG. 9 shows the response waveforms confirmed in the 3rd preferred embodiment. These response waveforms are obtained when the first order lag element 42 of the control computation unit 20 has its cutoff angular frequency $\omega cc^*$ adjusted equal to $\omega cc$, with the cutoff angular frequency $\omega cc$ of the first order lag element of the controlled object 10 set to 10 rad/s. Further, the response waveforms in FIG. 9 refers to those respectively of the controlled variable eo(t) and the manipulation variable command ec(t) in the case where the control variable command ei carries stepwise from 0 to 1 at the time t=0 second, and the disturbance ed likewise changes from 0 to $-1$. These response waveforms signify that finite settling control is completed for a period of 1 second, equal to the delay time Tc, for the respective variations of the control variable command ei and the disturbance ed.

Likewise in the 2nd preferred embodiment specified in FIG. 5, the 3rd preferred embodiment in FIG. 8 can be modified for use in sampled data control.

(4th Preferred Embodiment)

Illustrated in FIG. 10 is a system configuration of the 4th preferred embodiment of the present invention. Commonly in the 1st and 2nd preferred embodiments, each controlled object 10 is of such a configuration wherein the controlled object is represented by the integrator 11 only, whereas in the 4th preferred embodiment, the controlled object 10 is defined by a dead time element 14 and the integrator 11 which are serially connected to each other. The controlled object 10 corresponds to a water tank undergoing water level control wherein a flow control valve has some dead time in its response to the changes of the controlled variable.

The numeral 10 signifies a controlled object which is represented by an integrator 11, an adder 12 which incurs the disturbance ed, and a dead time element 14. The dead time of the dead time element 14 is Td. Included in a control computation unit 20 are subtracters 21, 24, and 33, an adder 34, integrating amplifiers 22 and 23, proportional amplifiers 23 and 30, and a delay element 31. This system configuration is the same as that of the 1st embodiment presented in FIG. 2; provided, the delay time of the delay element 31 is different from that of the counterpart in the 1st preferred embodiment. The numeral 43 denotes an integrating amplifier, 44 a proportional amplifier, 45 an adder, 46 and 47 delay elements, and 48 an adder, all of which are newly added to the configuration of the 1st preferred embodiment.

The difference ex between the controlled variable detected by a control variable detector (omitted from being illustrated) and an output e32 of the integrating amplifier 32 is figured out by the subtracter 33. The calculated difference ex is then input not only to the subtracter 21 but also to the proportional amplifier 23, and delay elements 31 and 46.

As shown in the figure, the delay element 31 keeps a transfer function $(1-\epsilon^{-STd^*})$ including the transfer function $\epsilon^{-STd^*}$ of the delay time (dead time) adjusted as far approximation as possible to the delay time Td of the controlled object 10. The output e31 of the delay element 31 is a difference between the input applied thereto and another input also fed thereto while delayed by Td.

The output e31 of the delay element 31 is integrated by the integrating amplifier 43 with the same integration gain Ki as that of the integrating amplifier 22, and subsequently, proportionally amplified as much as Kp, the same gain of the proportional amplifier. The output e43 of the integrating amplifier 43, and the output e44 from the proportional amplifier 44 are summed up by the adder 45, whereby a sumup signal ez is generated.

In the meantime, as shown in the figure, keeps the transfer function [Kc $\epsilon^{-S(Tc-Td^*)}$] including a delay (dead) time transfer function $\epsilon^{-S(Tc-Td^*)}$ is kept. The output ey of the delay element 46 is a proportional gain Kc-multiple of the differential signal ex, and input to the delay element 46 and which is delayed by Tc$-$Td$^*$.

The time Tc is so selected to settle the controlled variable of the controlled object involved within said time.

The output ey of the delay element 46 is input further to the delay element 47. As shown in the figure, the delay element 47 keeps a delay (dead) time transfer function $\epsilon^{-STd*}$ while the output ey of the delay element 46 is delayed as much as Td*. Summing up the outputs respectively of the delay elements 46 and 47 provides an output e47 which is proportional to the magnitude of the signal ex delayed as much as the delay time Tc.

The sum e48 between the sumup signal ez and the output e47 is figured out by the adder 48, and subsequently, input to the integrating amplifier 32. The control computation unit 20 has a loop formed therein with the delay element 31, integrating amplifier, proportional amplifier, delay elements 46, and 47, and the integrating amplifier 32.

The control variable command ei is multiplied as much as Ka, a proportional gain by the proportional amplifier 30. The output e30 of this proportional amplifier 30 is input to the subtracter 21 wherein the difference $\Delta e$ between the output e30 and the output ex of the subtracter 33 is calculated. The figured-out difference $\Delta e$ goes through integrating amplification thereafter by the integrating amplifier 22. From the output e22 and the output e23, a proportional gain Kp-multiple of a differential signal ex, and which is from the proportional amplifier 23 is subtracted by the subtracter 24. The outcome e24 of this subtraction and the output ey of the delay element 46 are summed up by the adder 34 whereby the manipulation variable command ec is provided. The controlled object 10 is operated according to the manipulation variable command ec just calculated.

With the system configuration referred to above, finite settling control is feasible even where a controlled object contains a dead time element. FIG. 11 gives the response waveforms which go with the 4th preferred embodiment. More precisely, they are obtainable where the dead time Td of the dead time element of the controlled object 10 is set to 0.1 seconds, with the dead time Td* of the respective dead time elements 31, 46, and 47 within the control computation unit 20 adjusted equal to Td. Namely, these response waveforms refer to the waveforms respectively of the controlled variable eo(t) and the manipulation variable command ec(t) in the case where the control variable command ei changes stepwise from 0 to 1 over the time T=0 second, and the disturbance ed likewise varies from 0 to −1 at the time T=5 seconds. Further, they signify that for some change of the control variable command ei, the controlled variable eo is settled over a time of 1.2 seconds equal to Tc+Td while, for a certain variation of the disturbance ed, the controlled variable eo gets settled over a time of 1 second equal to the delay time Tc.

In the 4th preferred embodiment shown in FIG. 10, the controlled object 10 contains some dead time. Even where the control computation unit 20 involves a certain computational delay time and/or even when the control variable detector (omitted from being illustrated) includes some delay time in its detection, adjusting the Td* included in the dead time element of the control computation unit 20 as far approximation to the sum of the above-remarked dead time and the respective delay times as possible enables finite settling control similar to the 1st through 4th preferred embodiments.

Further, with reference to FIG. 10, even when the dead time element 14 of the controlled object 10 is regarded existing as a computational delay time of the control computation unit 20, the computational delay time is negligible in the consideration of an entire control system. With this in view, it is clear that similar finite settling control is practicable regardless of the dead time of the controlled object 10.

In case the control variable detector (omitted from being illustrated) involves some detection delay time, the control system is of such a configuration with the dead time element 14 of the controlled object 10 shifted between the output of the integrator 11 and the integrator 33 of the control computation unit 20. This control system may be considered basically identical with the control system shown in FIG. 10. Therefore, with the control system wherein the control variable detector has some delay time in its detection, similar finite settling control is possible.

FIG. 12 presents the response waveforms which are out with the embodiment wherein the same control computation unit as that incorporated in the 4th preferred embodiment is applied, with the detection delay time Td of the control variable detector (omitted from being illustrated) set to 0.1 seconds, and further with the controlled object 10 configured such as is represented the integrator 11 only. These response waveforms refer to those respectively of the controlled variable eo(t) and the manipulation variable command ec(t) in the case where the control variable command ei changes stepwise from 0 to 1 at the time t=0 second, and the disturbance ed likewise varies from 0 to −1. Also in this case, for some changes respectively of the control variable command ei and the disturbance ed, each eo(t) of the corresponding controlled variables is settled over a time of 1 second equal to Tc. The response waveforms in FIG. 12 are different from those in FIG. 11 at one point that, with the former, there goes a 0.1 second quicker response to each control variable command, as compared with the latter.

Therefore, even where there coexist some computation delay time, dead time of a controlled object, and detection delay time of the control variable detector, adjusting the delay times Tc and the dead time Td*, with the time desired for due settling and the computation delay time as well as the detection delay time combined together renders the same control computation unit 20 applicable. In addition, similarly to the 2nd preferred embodiment, the 4th preferred embodiment is allowed to apply for sampled data control.

It is noted that each of the above-remarked proportional amplifiers, integrating amplifiers, first order lag elements, adders subtracters, and so forth are easily realized with an operational amplifier, a microcomputer or similar means thus far used with the feedback control system. For the delay element touched upon above, a coaxial cable which uses an electrical propagation delay characteristic, is applicable as a substitute, so far as a continuous-time system is concerned. On the other hand, in sampled data control, the delay element can otherwise be implemented by using a shift register or a memory.

So far, some preferred embodiments of the present invention have been illustrated in this specification. For some other controlled objects, the present invention further enables similar finite settling controls, and for one controlled object, the present invention also undertakes finite settling control in various system configurations other than those illustrated in the above-quoted preferred embodiments.

As described above, the present invention wherein a control computation unit of the feedback control system is added with a delay element as one system component primarily for prescribing the time desired for due settling, enables finite settling control so far considered workable only in sampled data control, likewise in a continuous-time system. According to the present invention, it is theoretically feasible to make an infinite time necessary for due settling finite, and in a practical sense, a finite settling time may be remarkably shortened.

Applying the present invention for sampled data control renders practical to realize control for due settling within a certain duration equivalent to an optional plurality of sampling periods, and further achieve robust control characterized by not only smoothness of performance—a feature of a continuous-time system—assured even with finite settling control but also hardness of being subject to adverse effects by noises and proofness against parametral fluctuations. Thus, the present invention is applicable for a wide variety of controllers with feedback control speciality, with immense serviceability expected.

The following literature discloses the fundamentals of the present invention:

Otto J. M. Smith, "Feedback Control Systems", McGraw-Hill Book Co., Inc., 1958, pp 341-345.

All disclosures in the above literature are incorporated in this specification.

In FIG. 10-29(e) on page 342 of the above literature, there is presented a system configuration similar to those shown in the preferred embodiments o the present invention. Although the system configuration of the present invention has a resemblance to the system configuration of said literature, it is different from the present invention.

More specifically, the block P in FIG. 10-29(e) of the literature corresponds to the time element 31 given in this specification. But this block includes a differentiating element, thereby undergoing adverse effects by noise with almost no practical serviceability made available.

Further, the system configuration in the above literature requires the respective inverse transfer functions (1/G1, 1/G2, and 1/F) for the transfer functions G1, G2, and F, while the control computation unit 20 in each of the preferred embodiments in this specification require no such inverse transfer functions.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A continuous deadbeat system with feedback control which operates a controlled object according to a manipulation variable command, comprising:
means for detecting an amount of control for said controlled object to provide a controlled variable;
means for controlling the amount of control for said controlled object according to a control output representing a difference between the controlled variable and the manipulation variable command, such that the controlled variable approaches to the manipulation variable command, wherein said controlling means has a transfer function F(s) containing a complex parameter s as a variable, and a degree of the complex parameter s, which is a denominator of an expression of the transfer function F(s), is equal to or more than a degree of the complex parameter s, which is a numerator of said expression; and
means for combining the control output with a delay signal which is obtained by delaying the controlled variable by a predetermined time, wherein the predetermined time is a time necessary to achieve the control performed by said controlling means.

2. The continuous deadbeat control system with feedback control according to claim 1, wherein said controlling means includes at least one of proportional elements and integrating elements.

3. The continuous deadbeat control system with feed back control according to claim 1, wherein said combining means has a transfer function including any element other than a differentiating element.

4. The continuous deadbeat control system with feedback control according to claim 1, wherein said predetermined time represents time necessary for the amount of control for said controlled object to follow changes in the manipulation variable command.

5. The continuous deadbeat control system with feedback control according to claim 1, wherein said predetermined time represents time necessary for restoring the controlled variable, which has varied due to an external disturbance imposed on said controlled object, to the manipulation control variable command.

6. The continuous deadbeat control system with feedback control according to claim 1, wherein said predetermined time includes time corresponding to a delay in the response of an output of said controlled object with respect to said control output.

7. The continuous deadbeat control system with feedback control according to claim 6, wherein said predetermined time includes time corresponding to the delay of the response of said controlled variable with respect to said control output.

8. The continuous deadbeat control system with feedback control according to claim 1, wherein said predetermined time includes time corresponding to a period of sampling a signal in the case where said controlling means includes a configuration of sampled data control which provides said control output, following the signal obtained by sampling said manipulation variable command.

9. The continuous deadbeat control system with feedback control according to claim 1, further comprising:
means for transforming said delay signal into a different signal; and
means for feeding, in place of said controlled variable, a difference between said controlled variable and said different signal to said combining means.

10. The continuous deadbeat control system with feedback control according to claim 9, wherein said controlled object includes a first order lag transfer function element and an integrating element for said control output, and
said transforming means includes said first order lag transfer function element and a transfer function element corresponding to said integrating element.

11. A continuous deadbeat control system with feedback control for controlling a controlled object so that a controlled variable of the controlled object approaches to a manipulation variable command, comprising;

means for generating a sampled manipulation variable command, by sampling the manipulation variable command; 'means for generating a sampled controlled variable by sampling he controlled variable;

means for detecting a difference between the sampled manipulation variable command and a predetermined signal corresponding to the sampled controlled variable;

1st means, having a 1st transfer function, for transforming said difference into a first signal;

2nd means, having a proportional element-contained transfer function, for transforming said predetermined signal into a 2nd signal;

3rd means, having a time delay element-contained transfer function, for transforming said predetermined signal into a 3rd signal, 4th means, having a 2nd transfer function, for transforming said 3rd signal into a 4th signal;

mean for providing said predetermined signal upon detecting a difference between said sampled controlled variable and said 4th signal; and means for providing a control output by combining said 3rd signal with a difference between said 1st signal and said 2nd signal, said control output serving to control said controlled object.

12. A continuous deadbeat control system with feedback control which controls a controlled object so that a controlled variable of the controlled object approaches to a manipulation variable command, comprising:

means for detecting a difference between the manipulation variable command and the controlled variable;

1st means, having an integrating element-contained transfer function, for transforming said difference into a 1st signal;

2nd means, having a proportional element-contained transfer function, for transforming a predetermined signal, corresponding to said controlled variable, into a 2nd signal;

3rd means, having a time delay element-contained transfer function, for transforming said predetermined signal into a 3rd signal;

4th means, having an integrating element-contained transfer function, for transforming said 3rd signal into a 4th signal;

means for providing said predetermined signal upon detecting a difference between said controlled variable and said 4th signal; and means for providing a control output by combining said 3rd signal with a difference between sad 1st signal and said 2nd signal, said control output serving to control said controlled object.

13. The continuous deadbeat control system with feedback control according to claim 12, further comprising:

feed forward composing means, coupled in parallel to said 1st means, for composing a signal of which magnitude is proportional to said manipulation variable command with said 1st signal.

14. The continuous deadbeat control system with feedback control according to claim 12, wherein said 4th means includes a first order lag transfer function element in the case where said controlled object includes a first order lag transfer function element.

15. The continuous deadbeat control system with feedback control according to claim 12, wherein said 4th means includes a time delay transfer function element in the case where said controlled object includes a time delay transfer function element.

16. A continuous deadbeat control system with feedback control which operates a controlled object according to a manipulation variable command, comprising:

means for detecting an amount of control for said controlled object to provide a controlled variable;

means for controlling the amount of control for said controlled object according to a control output representing a difference between the controlled variable and the manipulation variable command, such that the controlled variable approaches to the manipulation variable command, wherein said controlling means has a transfer function $F(s)$ containing a complex parameter $s$ as a variable, and a degree of the complex parameter $s$, which is a denominator of an expression of the transfer function $F(s)$, exceeds a degree of the complex parameter $s$, which is a numerator of said expression, and wherein said controlling means includes a delay element.

* * * * *